(12) United States Patent
Eckel et al.

(10) Patent No.: US 10,903,757 B2
(45) Date of Patent: Jan. 26, 2021

(54) POWER MODULE FOR A CONVERTER AND MULTI-LEVEL CONVERTER

(71) Applicant: SIEMENS AKTIENGESELLSCHAFT, Munich (DE)

(72) Inventors: Hans-Guenter Eckel, Rostock (DE); Daniel Schmitt, Postbauer-Heng (DE); Frank Schremmer, Fuerth (DE); Marcus Wahle, Veitsbronn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/637,838

(22) PCT Filed: Aug. 9, 2017

(86) PCT No.: PCT/EP2017/070157
§ 371 (c)(1),
(2) Date: Feb. 10, 2020

(87) PCT Pub. No.: WO2019/029796
PCT Pub. Date: Feb. 14, 2019

(65) Prior Publication Data
US 2020/0382020 A1 Dec. 3, 2020

(51) Int. Cl.
*H02M 7/483* (2007.01)
*H02M 1/32* (2007.01)
(52) U.S. Cl.
CPC ............ *H02M 7/483* (2013.01); *H02M 1/32* (2013.01); *H02M 2007/4835* (2013.01)
(58) Field of Classification Search
CPC . H02M 7/483; H02M 1/32; H02M 2007/4835
See application file for complete search history.

(56) References Cited

U.S. PATENT DOCUMENTS

| | | | |
|---|---|---|---|
| 2008/0232145 A1* | 9/2008 | Hiller | H02M 7/483 363/56.01 |
| 2011/0235221 A1* | 9/2011 | Vogeli | H02M 1/32 361/18 |

(Continued)

FOREIGN PATENT DOCUMENTS

| | | |
|---|---|---|
| DE | 1613735 A1 | 6/1970 |
| EP | 2747267 A1 | 6/2014 |

(Continued)

OTHER PUBLICATIONS

PCT International Search Report and Written Opinion of International Searching Authority dated Apr. 10, 2018 corresponding to PCT International Application No. PCT/EP2017/070157 filed Aug. 9, 2017.

(Continued)

*Primary Examiner* — Jue Zhang
(74) *Attorney, Agent, or Firm* — Laurence Greenberg; Werner Stemer; Ralph Locher

(57) ABSTRACT

A power module for a converter, in particular for a multi-level converter. The power module includes a link circuit capacitor, two connection terminals, at least one half-bridge connected in parallel with the link circuit capacitor and having two semiconductor switches, and, for each half-bridge, a bypass diode connected in parallel with a first semiconductor switch of the half-bridge and a load-relief circuit group connected in parallel with the first semiconductor switch. The load-relief circuit group has a load-relief thyristor and a load-relief diode connected in series with the load-relief thyristor.

19 Claims, 2 Drawing Sheets

(56) References Cited

U.S. PATENT DOCUMENTS

| | | | | |
|---|---|---|---|---|
| 2016/0056710 A1* | 2/2016 | Hafner | ............... | H02M 7/5387 |
| | | | | 363/53 |
| 2016/0072267 A1* | 3/2016 | Fu | .......................... | H02M 1/32 |
| | | | | 219/488 |
| 2017/0012521 A1* | 1/2017 | Jimichi | .................. | H02M 1/32 |

FOREIGN PATENT DOCUMENTS

| | | |
|---|---|---|
| EP | 2940845 A1 | 11/2015 |
| EP | 3068008 A1 | 9/2016 |
| JP | S61-81176 A | 4/1986 |
| JP | S61157257 A | 7/1986 |
| WO | WO 2016134786 A1 | 9/2016 |

OTHER PUBLICATIONS

Marquardt R: "Modular Multilevel Converter: An universal concept for HVDC-Networks and extended DC-Bus-applications", The 2010 International Power Electronics Conference, ISBN 978-1-4244-5393-1, pp. 502-507; 2010.

\* cited by examiner

POWER MODULE FOR A CONVERTER AND MULTI-LEVEL CONVERTER

BACKGROUND OF THE INVENTION

Field of the Invention

The invention relates to a power module for a converter, and a multi-level converter.

s A "multi-level converter" is understood as a converter which generates voltages, each of which can assume at least three voltage values (for each phase of the converter). One advantage of a multi-level converter over a conventional two-level converter is, for example, the generation of low-harmonic output voltages. Modular multi-level converters comprise a plurality of series-connected power modules, which are also described as sub-modules. It is necessary for the power modules of modular multi-level converters to be designed for various fault scenarios. If, for example, a fault occurs at the power module level, as a result of which a power module is no longer functional, it must be possible for said power module to be extracted from the series circuit. Moreover, for example as a result of short-circuits, faults can occur which affect the entire converter, and thus all the power modules.

SUMMARY OF THE INVENTION

The object of the invention is the disclosure of a power module for a converter, specifically for a modular multi-level converter, having an improved design for fault scenarios.

This object is fulfilled according to the invention as claimed.

Advantageous configurations of the invention are the subject matter of the dependent claims.

A power module according to the invention for a converter, specifically for a multi-level converter, comprises an intermediate circuit capacitor, two connection terminals, at least one half-bridge connected in parallel with the intermediate circuit capacitor and having two semiconductor switches and, for each half-bridge, a bypass diode connected in parallel with a first semiconductor switch of the half-bridge and a load-relief circuit unit connected in parallel with the first semiconductor switch, which load-relief circuit unit comprises a load-relief thyristor and a load-relief diode connected in series with the load-relief thyristor.

In the event of a fault, the parallel connection of a load-relief circuit unit with a semiconductor switch in each half-bridge advantageously permits a bridging of the respective half-bridge in a first current direction. Thus, in the event of a fault, the load-relief diode can absorb rapid voltage variations, which cannot be accommodated by the load-relief thyristor. The bypass diode can advantageously absorb fault currents in a second current direction, which are not absorbed by the load-relief circuit unit.

According to one configuration of the invention, it is provided that the power module comprises exactly one half-bridge which is connected in parallel with the intermediate circuit capacitor, the first semiconductor switch, on the input side and the output side, is directly electrically connected to one connection terminal respectively, and the load-relief circuit unit comprises a smoothing capacitor which is connected in parallel with the load-relief thyristor.

This configuration of the invention applies to a power module which comprises only one half-bridge having two semiconductor switches. The smoothing capacitor which is connected in parallel with the load-relief thyristor, in the normal operation of the power module, is charged, and is only discharged relatively slowly by means of the junction current of the load-relief diode, such that rapid voltage variations occur on the load-relief diode, and the load on the load-relief thyristor is relieved.

According to a further configuration of the invention, it is provided that the anode of the load-relief diode and the cathode of the bypass diode are directly electrically connected to a center tap of the half-bridge, and the cathode of the load-relief diode is directly electrically connected to the anode of the load-relief thyristor. The cathode of the load-relief diode can further be electrically connected, via a connecting resistor, to one of the electrodes of the intermediate circuit capacitor, which electrode is connected to the second semiconductor switch.

According to a further configuration of the invention, it is provided that each semiconductor switch comprises a bipolar transistor having an insulated gate electrode (IGBT=insulated-gate bipolar transistor) and a freewheeling diode which is connected in an antiparallel arrangement thereto. IGBTs are advantageously appropriate by way of semiconductor switches, on the grounds of their high voltage and current limits. The bypass diode can execute the operational load relief of the freewheeling diode which is connected in parallel thereto.

According to further configurations of the invention, it is provided that the load-relief diode is a disk-type diode, and/or that the bypass diode is a disk-type diode, and/or that the load-relief thyristor is a disk-type thyristor. In the event of a fault, disk-type components, such as a disk-type diode and a disk-type thyristor, advantageously permit a particularly secure transition to a short-circuit mode by means of shorting, such that the power module of the converter is securely bridged in the event of a fault.

A modular multi-level converter according to the invention comprises a plurality of power modules according to the invention. The advantages of a multi-level converter of this type proceed from the above-mentioned advantages of power modules according to the invention.

The above-mentioned properties, characteristics and advantages of the present invention, and the manner in which these are achieved, will be elucidated and clarified by reference to the following description of exemplary embodiments, which are described in greater detail with reference to the drawings. In the drawings:

DESCRIPTION OF THE INVENTION

Mutually corresponding parts are identified in the figures by the same reference numbers.

Figure 1:
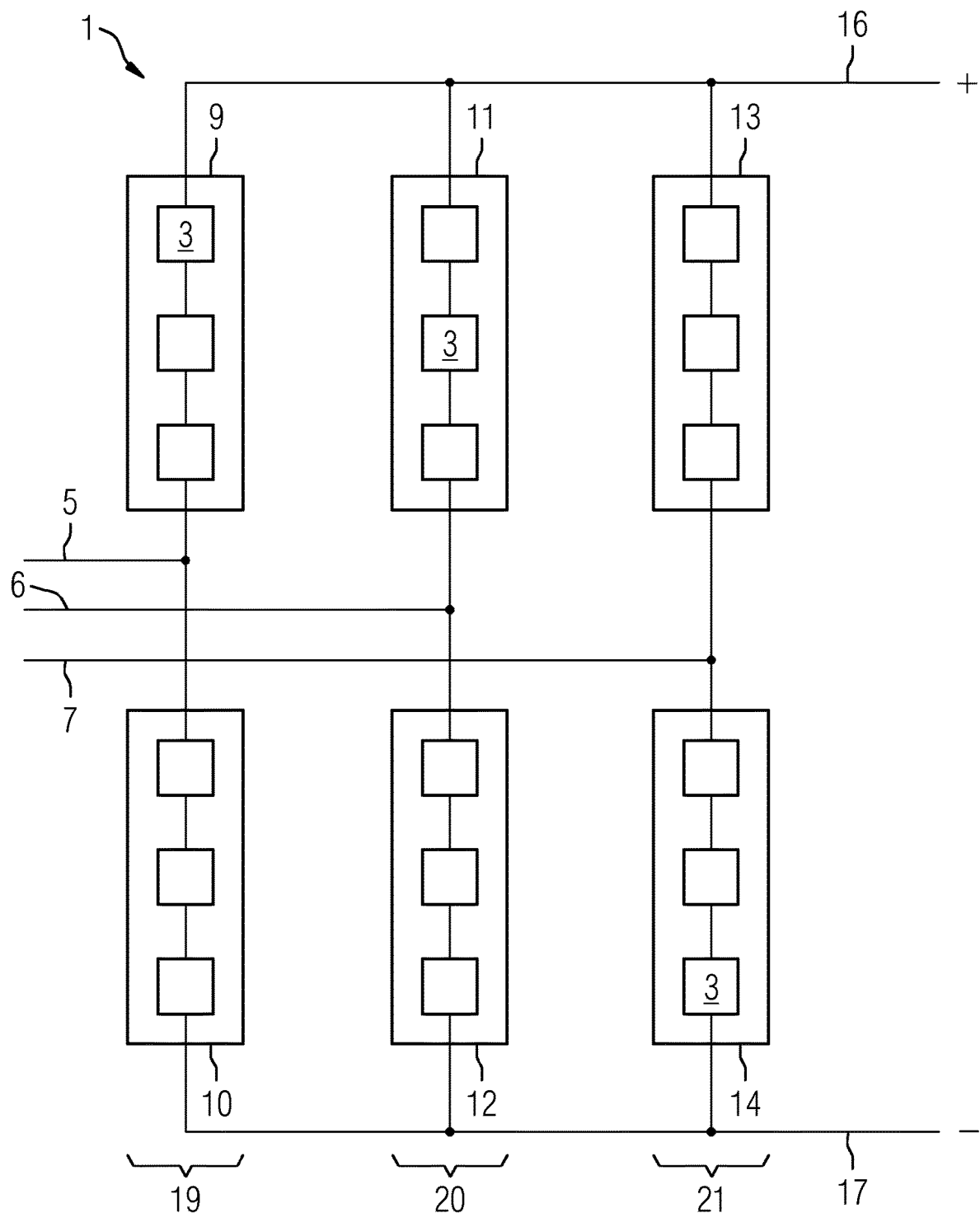
FIG. 1 shows a circuit diagram of an exemplary embodiment of a converter.

FIG. 1 shows a circuit diagram of an exemplary embodiment of a converter 1. The converter 1 is configured as a three-phase modular multi-level converter, which comprises a plurality of power modules 3. The converter 1 comprises a first AC voltage terminal 5, a second AC voltage terminal 6 and a third AC voltage terminal 7.

The first AC voltage terminal 5 is electrically connected to a first phase module branch 9 and to a second phase module branch 10. The first phase module branch 9 and the second phase module branch 10 constitute a first phase module 19 of the converter 1. The end of the first phase module branch 9 which is averted from the first AC voltage terminal 5 is electrically connected to a first DC voltage terminal 16. The end of the second phase module branch 10 which is averted from the first AC voltage terminal 5 is electrically connected to a second DC voltage terminal 17. The first DC voltage terminal 16 is a positive DC voltage terminal. The second DC voltage terminal 17 is a negative DC voltage terminal.

The second AC voltage terminal 6 is electrically connected to one end of the third phase module branch 11 and to one end of a fourth phase module branch 12. The third phase module branch 11 and the fourth phase module branch 12 constitute a second phase module 20.

The third AC voltage terminal 7 is electrically connected to one end of a fifth phase module branch 13 and to one end of a sixth phase module branch 14. The fifth phase module branch 13 and the sixth phase module branch 14 constitute a third phase module 21.

The end of the third phase module branch 11 which is averted from the second AC voltage terminal 6 and the end of the fifth phase module branch 13 which is averted from the third AC voltage terminal 7 are electrically connected to the first DC voltage terminal 16.

The end of the fourth phase module branch 12 which is averted from the second AC voltage terminal 6 and the end of the sixth phase module branch 14 which is averted from the third AC voltage terminal 7 are electrically connected to the second DC voltage terminal 17.

Each phase module branch 9 to 14 comprises a plurality of power modules 3, which are electrically connected in series. In the exemplary embodiment according to FIG. 1, each phase module branch 9 to 14 comprises three power modules 3. Other exemplary embodiments of a converter 1 can comprise different numbers of electrically series-connected power modules 3; although at least two power modules 3 are connected in series, it is also possible, for example, for 50 or 100 power modules 3 to be electrically connected in series.

Figure 2:
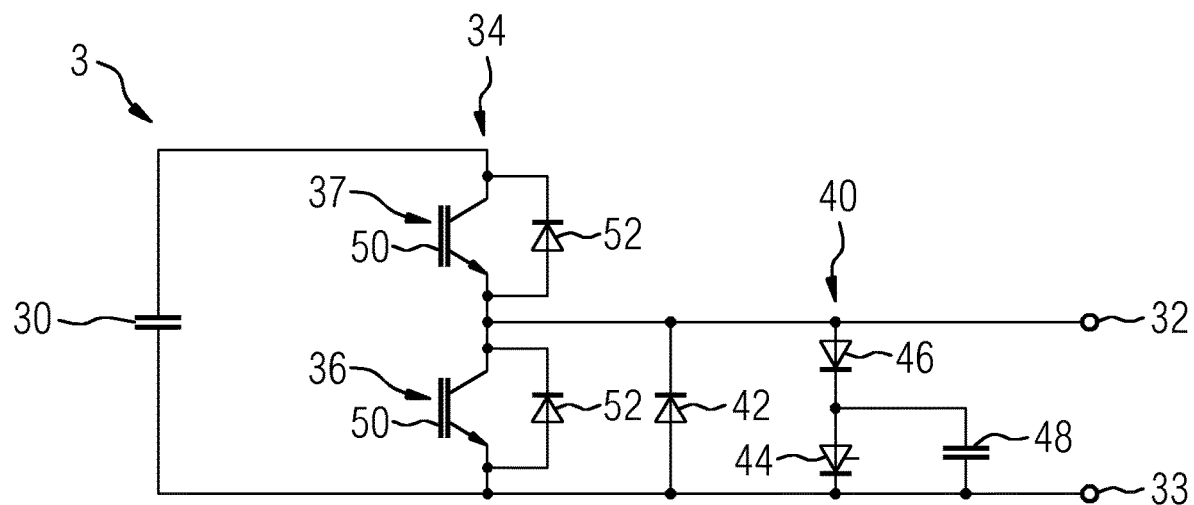
FIG. 2 shows a circuit diagram of a first exemplary embodiment of a power module for a converter.

FIG. 2 shows a circuit diagram of a first exemplary embodiment of a power module 3 for a converter 1. The power module 3 comprises an intermediate circuit capacitor 30, two connection terminals 32, 33, a half-bridge 34 which is connected in parallel with the intermediate circuit capacitor 30, having a first semiconductor switch 36 and a second semiconductor switch 37, a load-relief circuit unit 40 which is connected in parallel with the first semiconductor switch 36, and a bypass diode 42 which is connected in parallel with the first semiconductor switch 36 and the load-relief circuit unit 40. The first semiconductor switch 36, on the input side and the output side, is directly electrically connected to one connection terminal 32, 33 respectively.

The load-relief circuit unit 40 comprises a load-relief thyristor 44, a load-relief diode 46 which is connected in series with the load-relief thyristor 44, and a smoothing capacitor 48 which is connected in parallel with the load-relief thyristor 44.

The anode of the load-relief diode 46 and the cathode of the bypass diode 42 are directly electrically connected to a center tap of the half-bridge 34 and to a first connection terminal 32. The cathode of the load-relief diode 46 is directly electrically connected to the anode of the load-relief thyristor 44. The anode of the bypass diode 42 and the cathode of the load-relief thyristor 44 are directly electrically connected to the second connection terminal 33.

Figure 3:
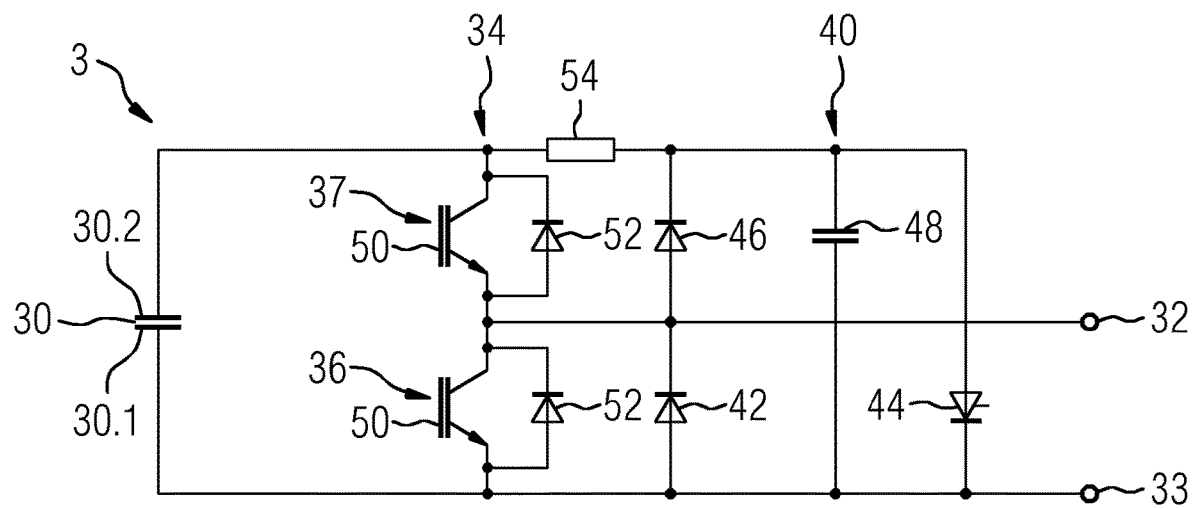
FIG. 3 shows a circuit diagram of a second exemplary embodiment of a power module for a converter.

FIG. 3 shows a circuit diagram of a second exemplary embodiment of a power module 3 for a converter 1. The power module 3 comprises an intermediate circuit capacitor 30, two connection terminals 32, 33, a connecting resistor 54, a half-bridge 34 which is connected in parallel with the intermediate circuit capacitor 30, having a first semiconductor switch 36 and a second semiconductor switch 37, a load-relief circuit unit 40 which is connected in parallel with the first semiconductor switch 36, and a bypass diode 42 which is connected in parallel with the first semiconductor switch 36 and the load-relief circuit unit 40.

The first semiconductor switch 36, on the input side and the output side, is directly electrically connected to one connection terminal 32, 33 respectively. A first electrode 30.1 of the intermediate circuit capacitor 30 is directly electrically connected to the first semiconductor switch 36. A second electrode 30.2 of the intermediate circuit capacitor 30 is directly electrically connected to the second semiconductor switch 37.

The load-relief circuit unit 40 comprises a load-relief thyristor 44, a load-relief diode 46 which is connected in series with the load-relief thyristor 44, and a smoothing capacitor 48 which is connected in parallel with the load-relief thyristor 44.

The anode of the load-relief diode 46 and the cathode of the bypass diode 42 are directly electrically connected to a center tap of the half-bridge 34 and to a first connection terminal 32. The cathode of the load-relief diode 46 is directly electrically connected to the anode of the load-relief thyristor 44 and, via the connecting resistor 54, is electrically connected to the second electrode 30.2 of the intermediate circuit capacitor 30. The anode of the bypass diode 42 and the cathode of the load-relief thyristor 44 are directly electrically connected to the second connection terminal 33 and to the first electrode 30.1 of the intermediate circuit capacitor 30.

In the exemplary embodiments represented in FIGS. 2 and 3, the semiconductor switches 36, 37 comprise a bipolar transistor 50 having an insulated gate electrode (IGBT) and a freewheeling diode 52 which is connected thereto in an antiparallel arrangement, wherein each IGBT is configured as an n-channel IGBT, and the collector of the IGBT of the first semiconductor switch 36 and the emitter of the IGBT of the second semiconductor switch 37 of the half-bridge 34 are respectively oriented towards the center tap of the half-bridge 34. Alternatively, however, the semiconductor switches 36, 37 can also assume a different configuration. The load-relief diode 46 and the bypass diode 42 can be respectively configured, for example, as a disk-type diode. The load-relief thyristor 44 can be configured, for example, as a disk-type thyristor.

In both of the exemplary embodiments represented in FIGS. 2 and 3, the function of the load-relief circuit unit 40 is to short-circuit the connection terminals 32, 33 in the event of a fault, in order to extract the power module 3 from the respective current path of the converter 1. In the event of a fault, a current flows from the first connection terminal 32 via the load-relief diode 46 and the load-relief thyristor 44 to the second connection terminal 33 or, in the inverse current direction, from the second connection terminal 33 via the bypass diode 42 to the first connection terminal 32. The smoothing capacitor 48 protects the load-relief thyristor 44 against rapid voltage variations. In the event of a fault, the load-relief diode 46 further absorbs rapid voltage variations which cannot be accommodated by the load-relief thyristor 44. In normal operation, the bypass diode 42 can support the freewheeling diode 52 of the first semiconductor switch 36.

Although the invention has been illustrated and described in greater detail with reference to preferred exemplary embodiments, the invention is not limited to the examples disclosed, and further variations can be inferred herefrom by a person skilled in the art, without departing from the protective scope of the invention.

LIST OF REFERENCE NUMBERS

1 Converter
3 Power module
5 to 7 AC voltage terminal
9 to 14 Phase module branch
16, 17 DC voltage terminal
19 to 21 Phase module
30 Intermediate circuit capacitor
30.1, 30.2 Electrode
32, 33 Connection terminal
34 Half-bridge
36, 37 Semiconductor switch
40 Load-relief circuit unit
42 Bypass diode
44 Load-relief thyristor
46 Load-relief diode
48 Smoothing capacitor
50 IGBT
52 Freewheeling diode
54 Connecting resistor
56 Load-relief capacitor

The invention claimed is:

1. A power module for a converter, the power module comprising:
an intermediate circuit capacitor;
two connection terminals;
one half-bridge connected in parallel with said intermediate circuit capacitor and having two semiconductor switches;
said two semiconductor switches including a first semiconductor switch having an input side and an output side, each directly electrically connected to a respective one of said connection terminals;
a bypass diode connected in parallel with said first semiconductor switch of said half-bridge and a load-relief circuit unit connected in parallel with said first semiconductor switch; and
said load-relief circuit unit including a load-relief thyristor, a load-relief diode connected in series with said load-relief thyristor, and a smoothing capacitor connected in parallel with said load-relief thyristor.

2. The power module according to claim 1, configured for integration in a multi-level converter.

3. The power module according to claim 1, wherein said bypass diode is a disk diode.

4. The power module according to claim 1, wherein an anode of said load-relief diode and a cathode of said bypass diode are directly electrically connected to a center tap of said at least one half-bridge, and a cathode of said load-relief diode is directly electrically connected to an anode of said load-relief thyristor.

5. The power module according to claim 4, wherein the cathode of said load-relief diode is electrically connected, via a connecting resistor, to one electrode of said intermediate circuit capacitor, and the one electrode is connected to said second semiconductor switch.

6. The power module according to claim 1, wherein said load-relief diode has a cathode that is electrically connected, via a connecting resistor, to one electrode of said intermediate circuit capacitor, and the one electrode is connected to said second semiconductor switch.

7. The power module according to claim 1, wherein each of said two semiconductor switches comprises a bipolar transistor having an insulated gate electrode and a freewheeling diode connected in an antiparallel arrangement to said bipolar transistor.

8. The power module according to claim 1, wherein said load-relief diode is a disk diode.

9. The power module according to claim 1, wherein said load-relief thyristor is a disk thyristor.

10. A modular multi-level converter, comprising a plurality of power modules each according to claim 1.

11. A power module for a converter, the power module comprising:
an intermediate circuit capacitor having first and second electrodes;
two connection terminals;
at least one half-bridge connected in parallel with said intermediate circuit capacitor and having two semiconductor switches; and
for each of said at least one half-bridge, a bypass diode connected in parallel with a first semiconductor switch of said two semiconductor switches of said half-bridge and a load-relief circuit unit connected in parallel with said first semiconductor switch;
said load-relief circuit unit including a load-relief thyristor and a load-relief diode connected in series with said load-relief thyristor, said load-relief diode having a cathode that is electrically connected, via a connecting resistor, to said second electrode of said intermediate circuit capacitor, and said second electrode being connected to said second semiconductor switch.

12. The power module according to claim 11, configured for integration in a multi-level converter.

13. The power module according to claim 11, wherein:
said at least one half-bride is exactly one half-bridge connected in parallel with said intermediate circuit capacitor;
said first semiconductor switch has an input side and an output side, each directly electrically connected to a respective one of said connection terminals; and
said load-relief circuit unit includes a smoothing capacitor connected in parallel with said load-relief thyristor.

14. The power module according to claim 11, wherein said bypass diode is a disk diode.

15. The power module according to claim 11, wherein an anode of said load-relief diode and a cathode of said bypass diode are directly electrically connected to a center tap of said at least one half-bridge, and a cathode of said load-relief diode is directly electrically connected to an anode of said load-relief thyristor.

16. The power module according to claim 11, wherein each of said two semiconductor switches comprises a bipolar transistor having an insulated gate electrode and a freewheeling diode connected in an antiparallel arrangement to said bipolar transistor.

17. The power module according to claim 11, wherein said load-relief diode is a disk diode.

18. The power module according to claim 11, wherein said load-relief thyristor is a disk thyristor.

19. A modular multi-level converter, comprising a plurality of power modules each according to claim 11.

* * * * *